(12) United States Patent
Kawano

(10) Patent No.: US 9,601,993 B2
(45) Date of Patent: *Mar. 21, 2017

(54) BOOSTING CIRCUIT OF CHARGE PUMP TYPE AND BOOSTING METHOD

(71) Applicant: LAPIS Semiconductor Co., Ltd., Yokohama (JP)

(72) Inventor: Hiroaki Kawano, Miyazaki (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 9 days.

This patent is subject to a terminal disclaimer.

(21) Appl. No.: 14/543,254

(22) Filed: Nov. 17, 2014

(65) Prior Publication Data

US 2015/0070083 A1    Mar. 12, 2015

Related U.S. Application Data

(60) Division of application No. 13/752,383, filed on Jan. 28, 2013, now Pat. No. 8,890,605, which is a continuation of application No. 13/064,324, filed on Mar. 18, 2011, now Pat. No. 8,373,498.

(30) Foreign Application Priority Data

Apr. 14, 2010   (JP) .................................. 2010-092993

(51) Int. Cl.
  *G05F 3/02*   (2006.01)
  *G05F 1/10*   (2006.01)
  *H02M 3/07*   (2006.01)

(52) U.S. Cl.
  CPC ................ *H02M 3/07* (2013.01); *G05F 1/10* (2013.01); *G05F 3/02* (2013.01)

(58) Field of Classification Search
  CPC .. H02M 3/073; H02M 3/07; H02M 2003/077; G11C 5/145; G05F 3/205
  USPC ............... 327/536; 363/59–60; 307/109–110
  See application file for complete search history.

(56) References Cited

U.S. PATENT DOCUMENTS

| | | | |
|---|---|---|---|
| 5,734,291 A | 3/1998 | Tasdighi et al. | |
| 5,999,040 A * | 12/1999 | Do et al. | ........................ 327/536 |
| 6,288,601 B1 * | 9/2001 | Tomishima | .................... 327/536 |
| 6,341,077 B1 * | 1/2002 | Sato | ................................ 363/60 |
| 6,459,328 B1 * | 10/2002 | Sato | ...................... H02M 3/073 |
| | | | 327/536 |

(Continued)

FOREIGN PATENT DOCUMENTS

| | | | |
|---|---|---|---|
| JP | 2004-064937 A | 2/2004 | |
| JP | 2006271191 A | 10/2006 | |
| KR | WO 2009119974 A2 * | 10/2009 | ................ H01P 1/15 |

*Primary Examiner* — Quan Tra
(74) *Attorney, Agent, or Firm* — Rabin & Berdo, P.C.

(57) ABSTRACT

A boosting circuit of charge pump type includes: charging portion for applying an input voltage to a first capacitor; double boosting portion for applying the input voltage to a second capacitor and applying a sum of the input voltage and a voltage across the first capacitor to an output capacitor in a first predetermined period after start of a boosting operation; and triple boosting portion for repeating in order, after end of the first predetermined period, a step of applying the sum of the input voltage and the voltage across the first capacitor to the second capacitor and a step of applying a sum of the voltage across the first capacitor and a voltage across the second capacitor to the output capacitor.

1 Claim, 6 Drawing Sheets

(56) References Cited

U.S. PATENT DOCUMENTS

| | | | |
|---|---|---|---|
| 6,960,955 B2 | 11/2005 | Nonaka | |
| 6,985,024 B2* | 1/2006 | Geen | 327/536 |
| 7,453,711 B2 | 11/2008 | Yanagida et al. | |
| 7,663,427 B2 | 2/2010 | Fujiwara | |
| 7,982,529 B2* | 7/2011 | Tranchina et al. | 327/536 |
| 8,022,749 B2 | 9/2011 | Schatzberger et al. | |
| 8,044,707 B2 | 10/2011 | Saman et al. | |
| 8,339,180 B2* | 12/2012 | Lee | H01P 1/15 327/427 |
| 8,593,213 B2* | 11/2013 | Neugebauer | 327/536 |
| 2007/0279950 A1 | 12/2007 | Sugiyama et al. | |
| 2008/0150619 A1 | 6/2008 | Lesso et al. | |
| 2009/0256627 A1* | 10/2009 | Hernandez-Garduno | H02M 3/073 327/536 |
| 2010/0156512 A1 | 6/2010 | Chaoui | |
| 2011/0227633 A1* | 9/2011 | Mo | H02M 3/07 327/517 |

* cited by examiner

BOOSTING CIRCUIT OF CHARGE PUMP TYPE AND BOOSTING METHOD

The present application is a Divisional Application of U.S. application Ser. No. 13/752,383, filed on Jan. 28, 2013, which is the Continuation Application of U.S. Pat. No. 8,373,498, filed on Mar. 18, 2011, and claims priority to and the benefit of Japanese Patent Application 2010-092993, filed on Apr. 14, 2010, which is herein incorporated by reference.

BACKGROUND OF THE INVENTION

1. Field of the Invention

The present invention relates to a boosting circuit of charge pump type and a boosting method for boosting an input voltage to a voltage three or higher integer times.

2. Description of the Related Background Art

Liquid crystal displays need a voltage higher than a power supply voltage to drive a liquid crystal display panel. For reduction in size and weight, a boosting circuit of charge pump type for boosting the power supply voltage is incorporated into a semiconductor integrated circuit that comprises a drive circuit (see Japanese Patent Application Laid-Open No. 2004-64937).

FIG. 1 shows the configuration of a conventional triple boosting circuit of charge pump type. The conventional boosting circuit has switch elements SW1A, SW1B, SW2A, SW2B, SW3A, and SW3B which are included in a semiconductor integrated circuit 1. The switch elements SW1A, SW1B, SW2A, SW2B, SW3A, and SW3B are on-off switches which are turned on/off by a not-shown controller. The semiconductor integrated circuit 1 has external component connection terminals A1 to A3, AC+, AC−, and AG. The switch elements SW1A and SW2B are each connected at one end to the connection terminal A1. The switch elements SW2A and SW3B are each connected at one end to the connection terminal A2. The switch element SW3A is connected at one end to the connection terminal A3. The switch element SW1B is connected at one end to the connection terminal AG, the ground terminal. The other ends of the switch elements SW1A, SW2A, and SW3A are connected to the connection terminal AC+. The other ends of the switch elements SW1B, SW2B, and SW3B are connected to the connection terminal AC−. The boosting circuit also includes capacitors Ca, C1, C2, and C3 for charge accumulation, which are external components of the semiconductor integrated circuit 1. One end of the pumping capacitor Ca is connected to the connection terminal AC+. The other end is connected to AC−. One end of the capacitor C1 is connected to the connection terminal A1. One end of the capacitor C2 is connected to the connection terminal A2. One end of the capacitor C3 is connected to the connection terminal A3. The other ends of the capacitors C1, C2, and C3 are connected to the connection terminal AG and are grounded (connected to Vss). For ease of description, the ground potential Vss will hereinafter be assumed to be 0 V.

In the conventional triple boosting circuit, an input voltage is applied to the capacitor C1. The input voltage will be referred to as VL1. In a boosting operation, the operations of first to fourth steps are repeated. The first to fourth steps have the same duration. As shown in FIG. 2, in the initial first step, the switch elements SW1A and SW1B are turned on, and the switch elements SW2A, SW2B, SW3A and SW3B are turned off. In the next second step, the switch elements SW1A, SW1B, SW3A, and SW3B are turned off, and the switch elements SW2A and SW2B are turned on. In the third step, the switch elements SW1A and SW1B are turned on, and the switch elements SW2A, SW2B, SW3A and SW3B are turned off. In the fourth step, the switch elements SW1A, SW1B, SW2A, and SW2B are turned off, and the switch elements SW3A and SW3B are turned on.

In the first step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the second step, the turning-on of the switch elements SW2A and SW2B applies the input voltage VL1 plus the voltage VL1 of the capacitor Ca to the capacitor C2, whereby the capacitor C2 is charged up. The voltage C+ of the capacitor Ca becomes VL1+VL1, and the voltage C− on the connection terminal AC− becomes VL1. The voltage VL2 on the connection terminal A2 of the capacitor C2 becomes VL1+VL1.

In the third step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the fourth step, the turning-on of the switch elements SW3A and SW3B applies the voltage VL2 of the capacitor C2 plus the voltage VL1 of the capacitor Ca to the capacitor C3, whereby the capacitor C3 is charged up. The voltage C+ of the capacitor Ca becomes VL2+VL1, and the voltage C− on the connection terminal AC− becomes equal to VL2 of the capacitor C2. Consequently, the voltage VL3 on the connection terminal A3 of the capacitor C3 becomes VL2+VL1, i.e., 3VL1.

The operations of the first to fourth steps are repeated in succession, whereby the voltage VL3 of the connection terminal A3 is maintained at the triple boost voltage 3VL1, and the voltage VL2 of the connection terminal A2 at the double boost voltage 2VL1.

When the conventional boosting circuit starts a boosting operation, relatively high currents flow into the uncharged capacitors C2 and C3 transiently, producing peak currents. The input voltage VL1 of the conventional boosting circuit is used as the power supply voltage of other circuits. For example, when the boosting circuit is used as the drive voltage generating circuit of an STN liquid crystal display chip, the input voltage VL1 is used as the power supply voltage of other circuits like logic circuits and an oscillator circuit in the semiconductor chip. However, in such a semiconductor chip, the input terminal of the power supply voltage is shared with those circuits for a reduction in chip size. There has thus been a problem in that the foregoing peak currents flowing into the capacitors C2 and C3 when the boosting circuit starts a boosting operation cause a temporary drop of the voltage VL1 to below the normal operating voltage in level, causing malfunction of the chip itself.

SUMMARY OF THE INVENTION

In view of the foregoing, it is an object of the present invention to provide a boosting circuit of charge pump type and a boosting method which can boost an input voltage to a voltage three or higher integer times without causing a drop in the level of the input voltage at the start of a boosting operation.

The boosting circuit according to the present invention is a boosting circuit of charge pump type for boosting an input voltage to a voltage three or higher integer times, the circuit including: charging portion for applying the input voltage to a first capacitor; double boosting portion for applying the input voltage to a second capacitor and applying a sum of the input voltage and a voltage across the first capacitor to an output capacitor in a first predetermined period after start of a boosting operation; and triple boosting portion for repeating in order, after end of the first predetermined period, a step of applying the sum of the input voltage and the voltage across the first capacitor to the second capacitor and a step of applying a sum of the voltage across the first capacitor and a voltage across the second capacitor to the output capacitor.

The boosting method according to the present invention is a boosting method for boosting an input voltage to a voltage three or higher integer times, the method including: a double boosting step of applying the input voltage to a first capacitor and applying a sum of the input voltage and a voltage across the first capacitor to an output capacitor in a first predetermined period after start of a boosting operation, while applying the input voltage to a second capacitor; and a triple boosting step of repeating in order, after end of the first predetermined period, a first application step of applying the input voltage to the first capacitor and applying a sum of the input voltage and the voltage across the first capacitor to the second capacitor and a second application step of applying the input voltage to the first capacitor and applying a sum of the voltage across the first capacitor and a voltage across the second capacitor to the output capacitor.

According to the boosting circuit and method of the present invention, the voltage applied to the output capacitor becomes twice the input voltage in the first predetermined period after the start of a boosting operation. After the end of the first predetermined period, the voltage applied to the output capacitor becomes three times the input voltage. In the first predetermined period, the input voltage is applied to the second capacitor so that the voltage across the second capacitor is the same as the input voltage. After the end of the first predetermined period, the voltage applied to the second capacitor becomes twice the input voltage. In order words, the voltages across the second capacitor and across the output capacitor both increase stepwise. The peak currents to flow into the second capacitor and the output capacitor, respectively, at the start of the boosting operation can thus be suppressed as compared to the conventional boosting circuit. This makes it possible to boost the input voltage to a voltage three or higher integer times without causing a drop in the level of the input voltage.

DETAILED DESCRIPTION OF THE INVENTION

Hereinafter, embodiments of the present invention will be described in detail with reference to the drawings.

Figure 3:
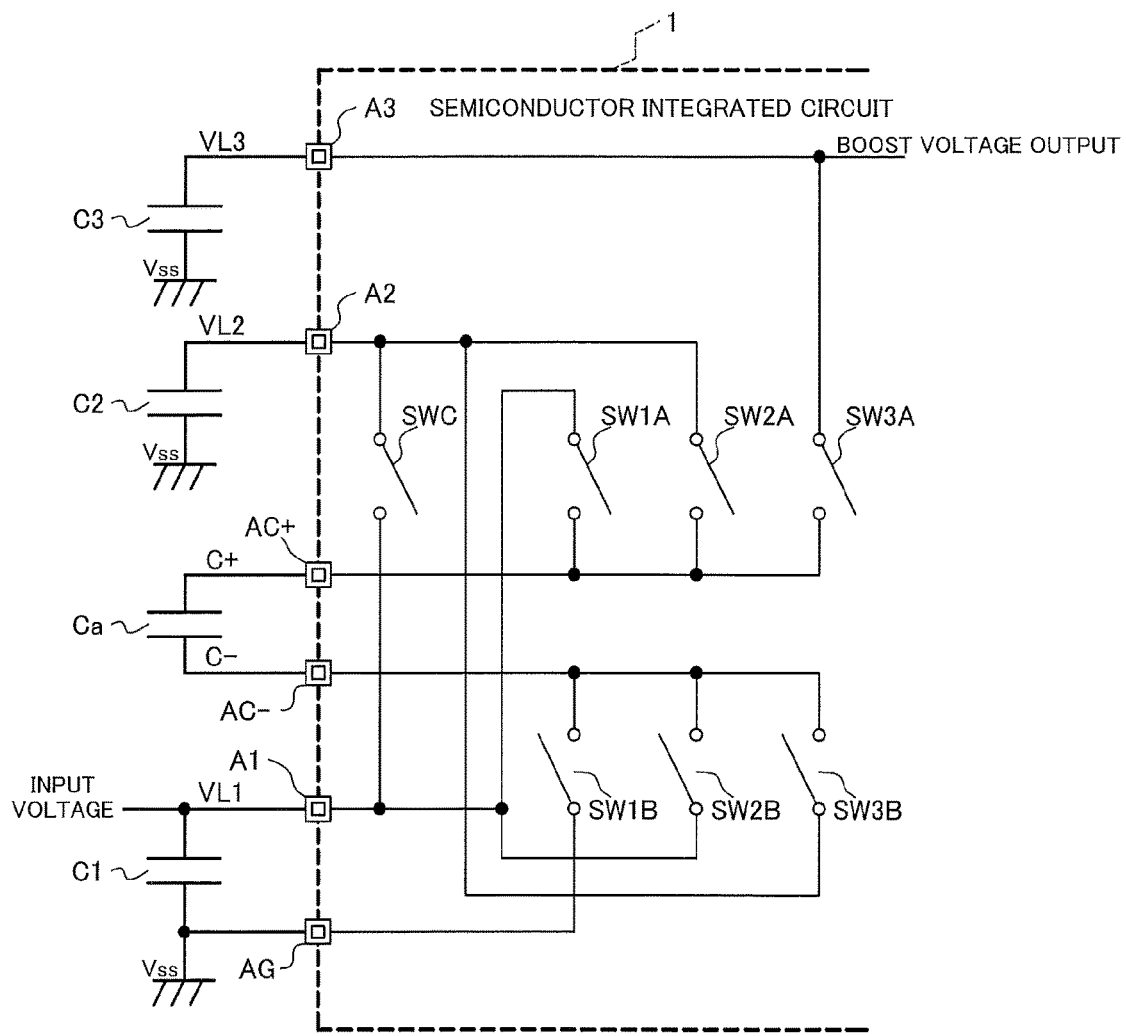
FIG. 3 is a circuit diagram showing a triple boosting circuit that is an embodiment of the present invention.

FIG. 3 shows a triple boosting circuit of charge pump type which is an embodiment of the present invention. Like the circuit of FIG. 1, the boosting circuit has switch elements SW1A (first switch element A), SW1B (first switch element B), SW2A (second switch element A), SW2B (second switch element B), SW3A (third switch element A), and SW3B (third switch element B) which are included in a semiconductor integrated circuit 1. The semiconductor integrated circuit 1 has external component connection thermals A1 to A3, AC+, AC−, and AG. The connection terminal A1 is a non-reference potential side input terminal, and the connection terminal AG is a reference potential side input terminal.

The semiconductor integrated circuit 1 also includes a switch element SWC (fourth switch element). The switch element SWC is also an on-off switch. One end of the switch element SWC is connected to the connection terminal A1. The other end is connected to the connection terminal A2. Like the switch elements SW1A, SW1B, SW2A, SW2B, SW3A, and SW3B, the switch element SWC is on/off controlled by a not-shown controller. The controller switches on/off each of the switch elements SW1A, SW1B, SW2A, SW2B, SW3A, SW3B, and SWC according to a clock which is generated by a not-shown clock generator.

Figure 1:
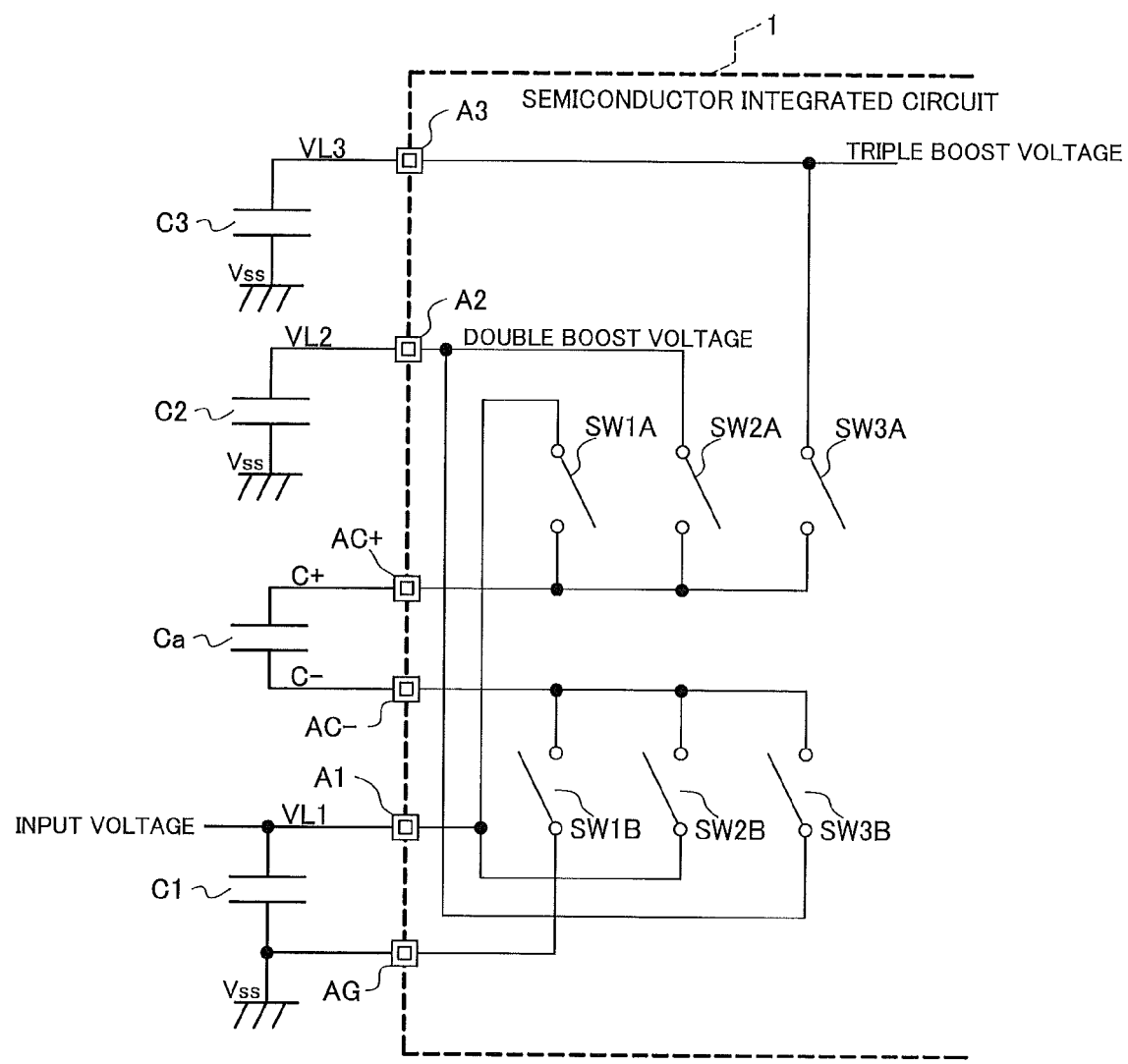
FIG. 1 is a circuit diagram showing a conventional triple boosting circuit.
Figure 2:
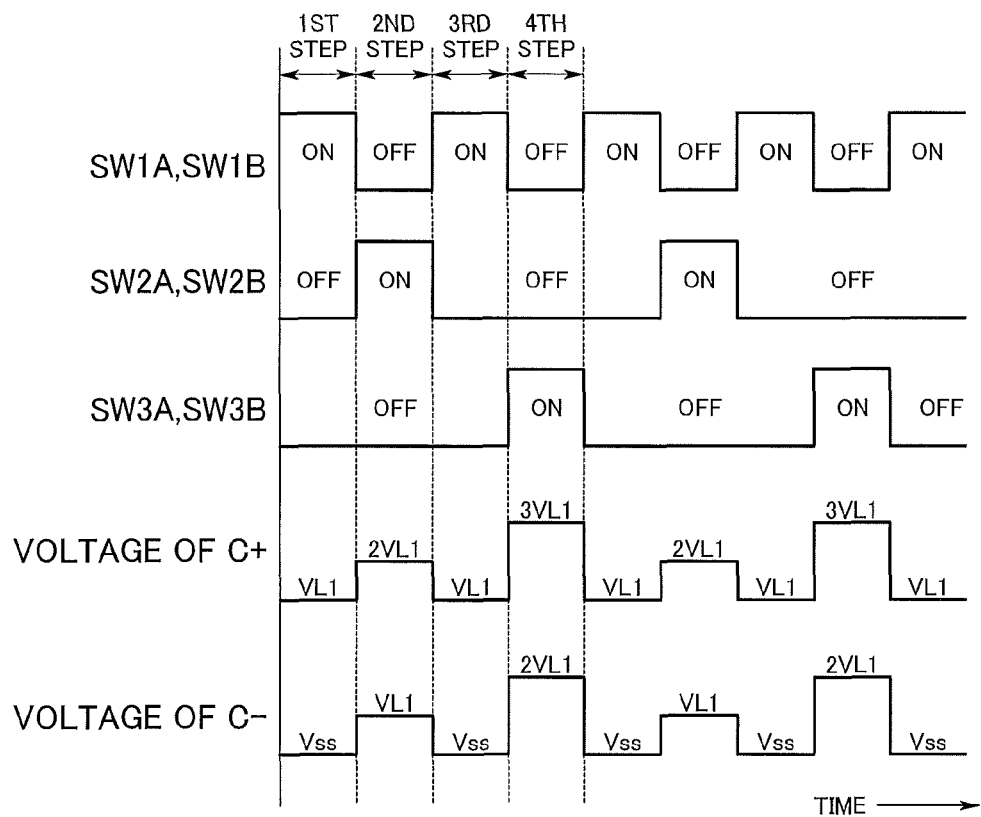
FIG. 2 is a chart showing turning-on/off of switch elements and terminal voltages of a pumping capacitor in the boosting circuit of FIG. 1.

Capacitors Ca, C1, C2, and C3 for charge accumulation are connected as external components of the semiconductor integrated circuit 1 as with the circuit of FIG. 1. The pumping capacitor Ca corresponds to the first capacitor, the capacitor C1 corresponds to the input capacitor, the capacitor C2 corresponds to the second capacitor, and the capacitor C3 corresponds to the output capacitor.

In other respects, the configuration is the same as that of the triple boosting circuit of FIG. 1. A description thereof will thus be omitted.

Figure 4:
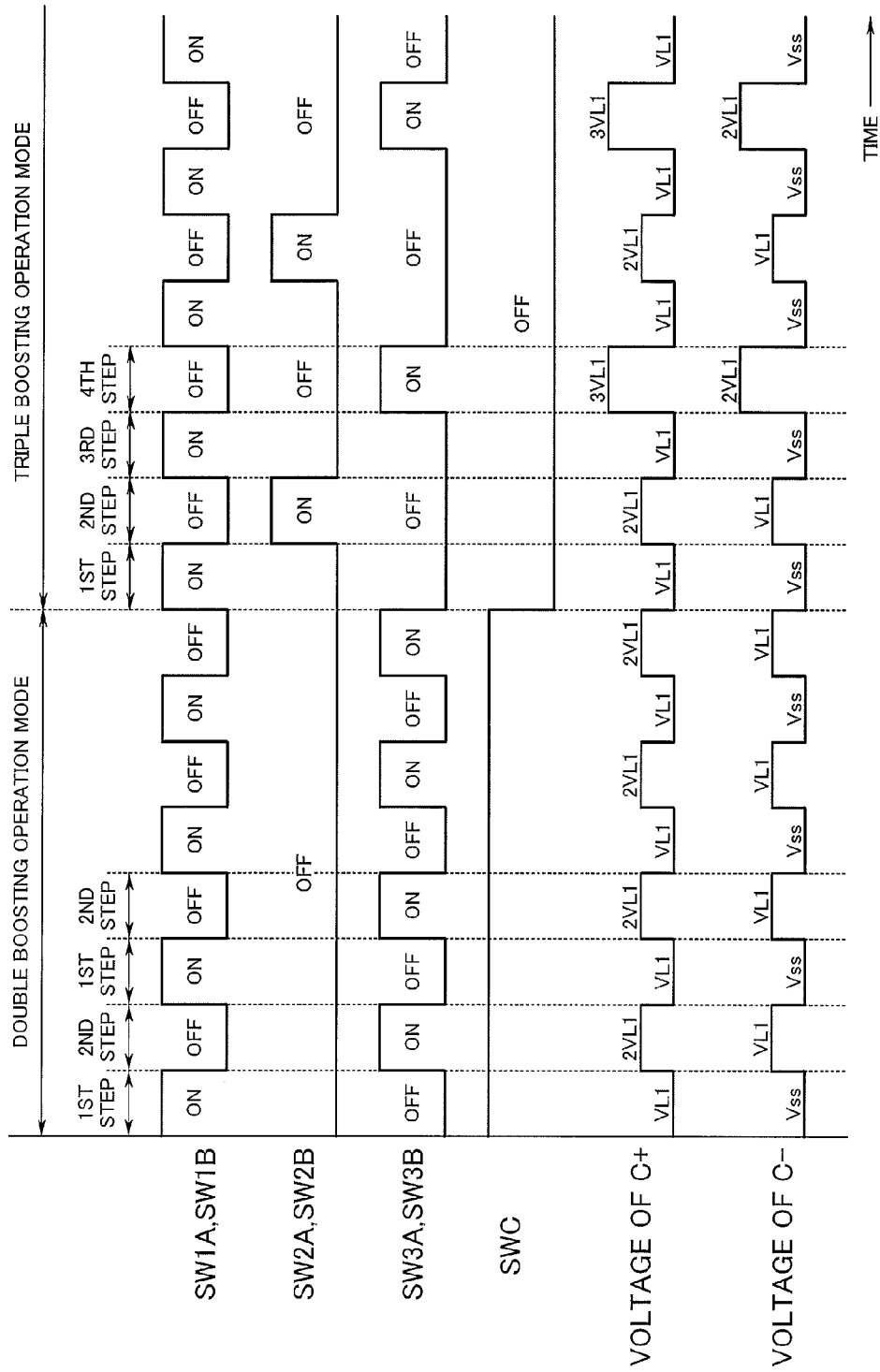
FIG. 4 is a chart showing turning-on/off of switch elements and terminal voltages of a pumping capacitor in the boosting circuit of FIG. 3.

As shown in FIG. 4, the triple boosting circuit of the present invention has operating modes including a double boosting operation mode and a triple boosting operation mode. For triple boost output, the double boosting operation mode is initially performed for a first predetermined period upon activation, before entering the triple boosting operation mode. The switch element SWC is turned on in the double boosting operation mode. The switch element SWC is turned off in the triple boosting operation mode.

In the double boosting operation mode, the operations of a first step (first step for double boosting) and a second step (second step for double boosting) are repeated as shown in FIG. 4. The switch elements SW2A and SW2B are always off. The switch element SWC is always on as mentioned above. In the first step, the switch elements SW1A and SW1B are turned on, and the switch elements SW3A and SW3B are turned off. In the next second step, the switch elements SW1A and SW1B are turned off, and the switch elements SW3A and SW3B are turned on.

In the first step, the turning-on of the switch elements SW1A and SW1B applies the input voltage VL1 to the capacitor Ca and the capacitor C2, whereby the capacitors Ca and C2 are charged up. The voltage C+ on the connection terminal AC+ of the capacitor Ca becomes VL1, and the voltage C− on the connection terminal AC− becomes Vss.

In the second step, the turning-on of the switch elements SW3A and SW3B applies the voltage VL1 of the capacitor Ca plus the input voltage VL1 to the capacitor C3, whereby the capacitor C3 is charged up. The voltage C+ of the capacitor Ca becomes VL1+VL1, and the voltage C− on the connection terminal AC− becomes VL1. The voltage VL3 on the connection terminal A3 of the capacitor C3 becomes VL1+VL1.

The operations of the first and second steps are repeated in succession for the first predetermined period, whereby the voltage VL3 of the connection terminal A3 is maintained at a double boost voltage 2VL1. In FIG. 4, the first predetermined period corresponds to four cycles, with the period of the first step for double boosting and the second step for double boosting as a cycle. The first predetermined period is not limited thereto, however, and may be as long as one cycle.

Next, in the triple boosting operation mode, the operations of first to fourth steps (the first step for triple boosting to the fourth step for triple boosting) are repeated as shown in FIG. 4. The switch element SWC is always off as mentioned above. In the first step, the switch elements SW1A and SW1B are turned on, and the switch elements SW2A, SW2B, SW3A and SW3B are turned off. In the next second step, the switch elements SW1A, SW1B, SW3A, and SW3B are turned off, and the switch elements SW2A and SW2B are turned on. In the third step, the switch elements SW1A and SW1B are turned on, and the switch elements SW2A, SW2B, SW3A and SW3B are turned off. In the fourth step, the switch elements SW1A, SW1B, SW2A, and SW2B are turned off, and the switch elements SW3A and SW3B are turned on.

In the first step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the second step, the turning-on of the switch elements SW2A and SW2B applies the input voltage VL1 plus the voltage VL1 of the capacitor Ca to the capacitor C2, whereby the capacitor C2 is charged up. That is, the voltage C+ of the capacitor Ca=VL1+VL1 is applied to the capacitor C2. The voltage C− on the connection terminal AC− becomes VL1. Immediately after entering the triple boosting operation mode, the capacitor C2 is charged in advance with the voltage VL1 on the connection terminal A2. The current that flows into the capacitor C2 when the voltage C+ of the capacitor Ca is applied to the capacitor C2 in the second step therefore has a suppressed peak as compared to the conventional circuit of FIG. 1.

In the third step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the fourth step, the turning-on of the switch elements SW3A and SW3B applies the voltage VL2 of the capacitor C2 plus the voltage VL1 of the capacitor Ca to the capacitor C3, whereby the capacitor C3 is charged up. The voltage C+ of the capacitor Ca becomes VL2+VL1, and the voltage C− on the connection terminal AC− becomes equal to VL2 of the capacitor C2. Immediately after entering the triple boosting operation mode, the capacitor C3 is charged in advance with the voltage 2VL1 on the connection terminal A3. The current that flows into the capacitor C3 when the voltage C+ of the capacitor Ca is applied to the capacitor C3 in the fourth step therefore has a suppressed peak as compared to the conventional circuit of FIG. 1. The voltage VL3 on the connection terminal A3 of the capacitor C3 becomes VL2+VL1, i.e., 3VL1.

Subsequently, the operations of the first to fourth steps in the triple boosting operation mode are repeated in succession, whereby the voltage VL3 of the connection terminal A3 is maintained at the triple boost voltage 3VL1, and the voltage VL2 of the connection terminal A2 at the double boost voltage 2VL1.

According to the embodiment of the triple boosting circuit of the present invention, in the double boosting operation mode in the first predetermined period since the start of a boosting operation, the capacitor C2 is charged by the application of the input voltage VL1 so that the voltage across the capacitor C2 becomes equal to VL1. In the second step for triple boosting after the end of the first predetermined period, the voltage applied to the capacitor C2 becomes VL1+VL1, i.e., twice the input voltage VL1. In the second step for double boosting in the first predetermined period, the application of the voltage VL1+VL1 to the capacitor C3 makes the voltage across the capacitor C3 equal to twice the input voltage VL1, i.e., 2VL1. In the fourth step for triple boosting after the end of the first predetermined period, the voltage applied to the capacitor C3 becomes equal to three times the input voltage, 3VL1. In order words, the voltages across the respective capacitors C2 and C3 increase stepwise. The peak currents to flow into the respective capacitors C2 and C3 at the start of the boosting operation can thus be suppressed as compared to the conventional boosting circuit. This makes it possible to boost the input voltage three times without causing a drop in the level of the input voltage.

Figure 5:
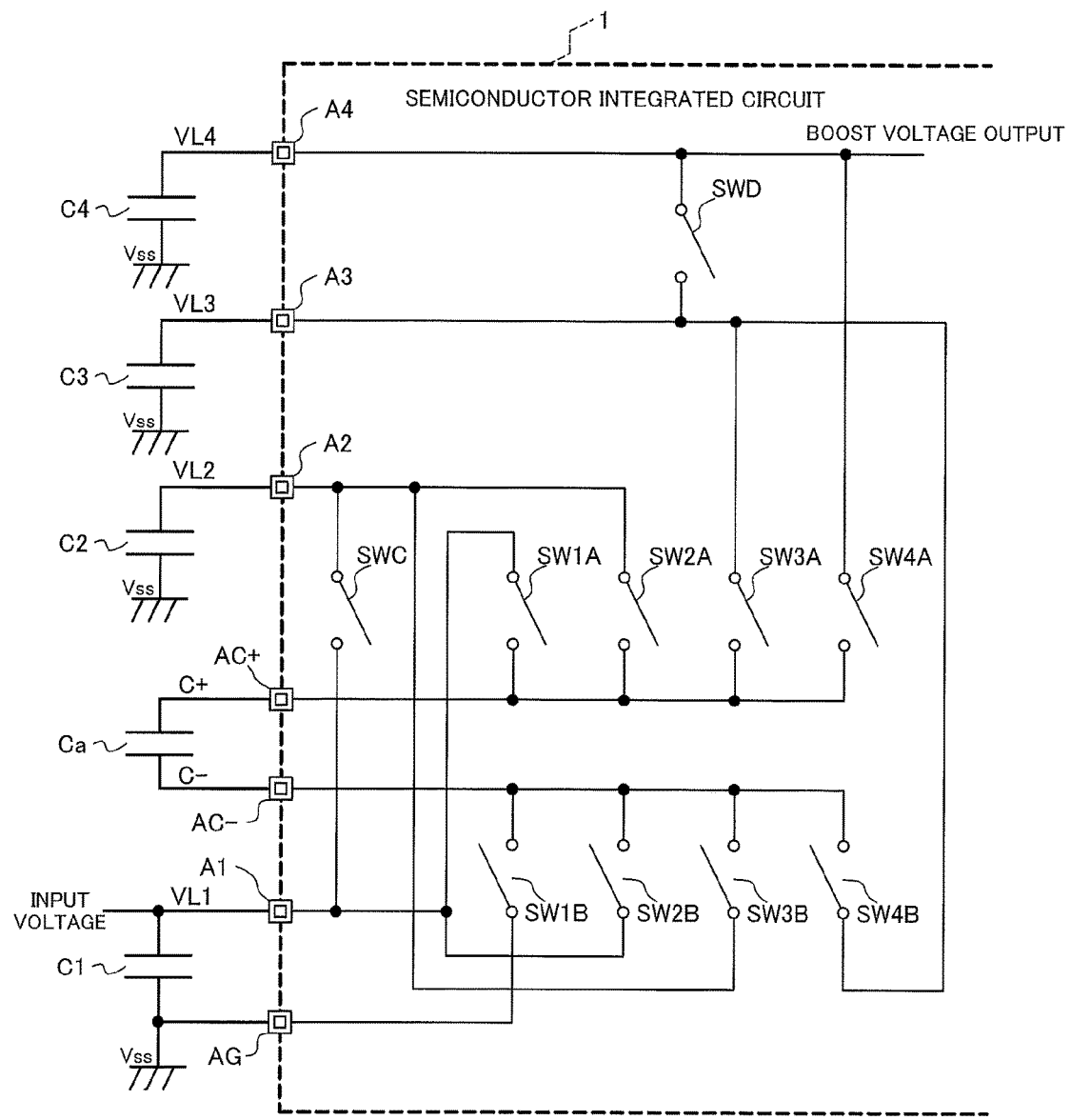
FIG. 5 is a circuit diagram showing a quadruple boosting circuit that is another embodiment of the present invention.

FIG. 5 shows a quadruple boosting circuit of charge pump type which is another embodiment of the present invention. The boosting circuit has switch elements SW1A, SW1B, SW2A, SW2B, SW3A, SW3B, SW4A, SW4B, SWC, and SWD which are included in a semiconductor integrated circuit 1. The semiconductor integrated circuit 1 has external component connection terminals A1 to A4, AC+, AC−, and AG.

The switch terminals SW4A, SW4B, and SWD, and the connection terminal A4 are added to the configuration of the triple boosting circuit of FIG. 3. The switch elements SW4A, SW4B, and SWD are on-off switches.

One end of the switch element SW4A is connected to the connection terminal A4. The other end is connected to the connection terminal AC+. One end of the switch element SW4B is connected to the connection terminal A3. The other end is connected to the connection terminal AC−. One end of the switch element SWD is connected to the connection terminal A3. The other end is connected to the connection terminal A4. Like the switch elements SW1A, SW1B, SW2A, SW2B, SW3A, SW3B, and SWC, the switch elements SW4A, SW4B, and SWD are on/off controlled by a not-shown controller. The controller switches on/off each of the switch elements SW1A, SW1B, SW2A, SW2B, SW3A, SW3B, SW4A, SW4B, SWC, and SWD according to a clock which is generated by a not-shown clock generator.

A capacitor C4 is connected between the connection terminal A4 and the ground (Vss).

In other respects, the configuration is the same as that of the triple boosting circuit of FIG. 3. A description thereof will thus be omitted.

Figure 6:
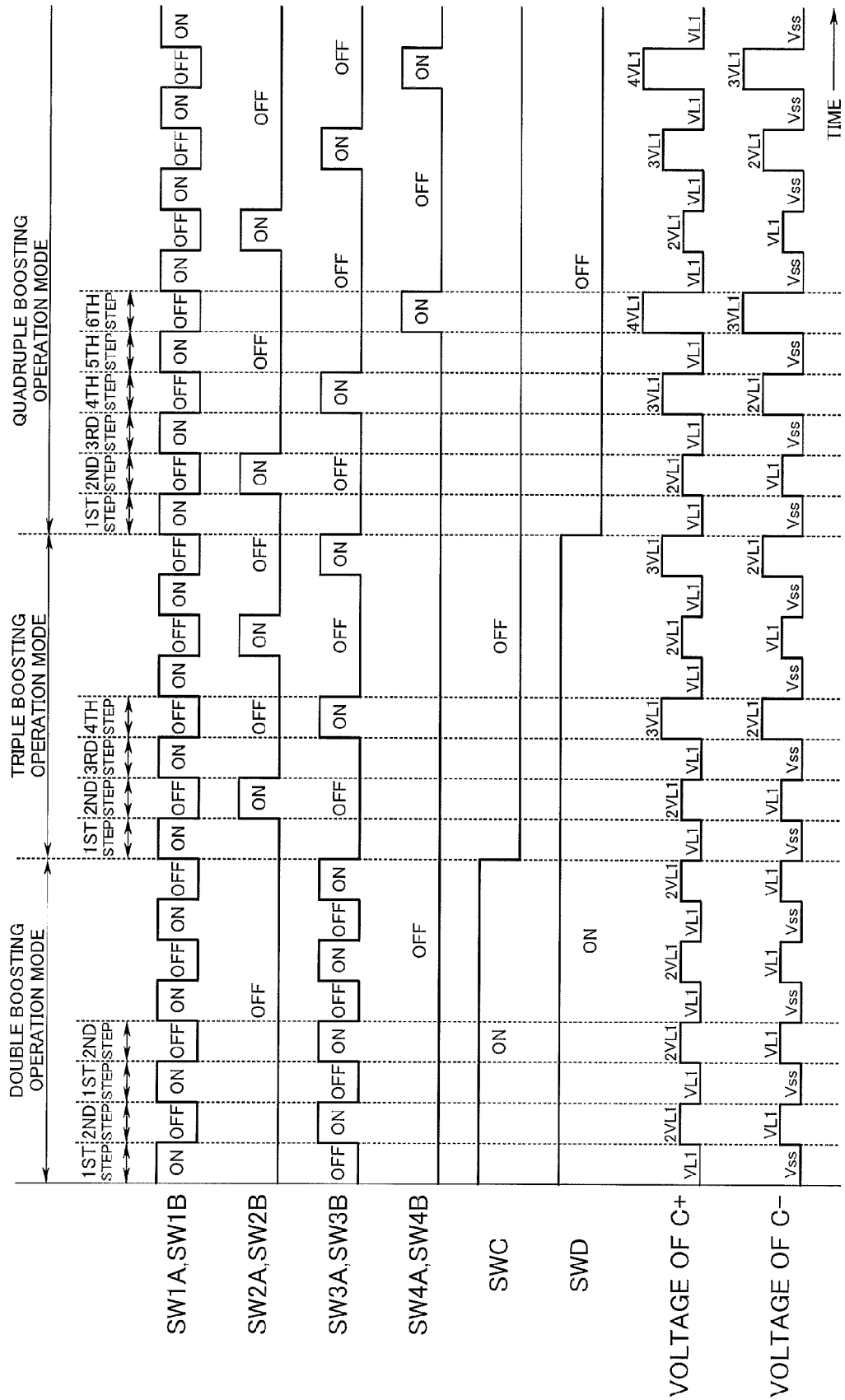
FIG. 6 is a chart showing turning-on/off of switch elements and terminal voltages of a pumping capacitor in the boosting circuit of FIG. 5.

As shown in FIG. 6, the quadruple boosting circuit of the present invention has operating modes including a double boosting operation mode, a triple boosting operation mode, and a quadruple boosting operation mode. For quadruple boost output, the double boosting operation mode is initially performed for a first predetermined period upon activation. The triple boosting operation mode is then performed for a second predetermined period. After the lapse of the second predetermined period, the quadruple boosting operation mode is entered. In the double boosting operation mode, the switch elements SWC and SWD both are on. In the triple boosting mode, the switch element SWC is turned off, and the switch element SWD is maintained on. In the quadruple boosting operation mode, the switch elements SWC and SWD both are turned off.

In the double boosting operation mode, the operations of a first step (first step for double boosting) and a second step (second step for double boosting) are repeated as shown in FIG. 6. The switch elements SW2A, SW2B, SW4A, and SW4B are always off. The switch elements SWC and SWD are always on as mentioned above. In the first step, the switch elements SW1A and SW1B are turned on, and the switch elements SW3A and SW3B are turned off. In the next second step, the switch elements SW1A and SW1B are turned off, and the switch elements SW3A and SW3B are turned on.

In the first step, the turning-on of the switch elements SW1A and SW1B applies the input voltage VL1 to the capacitor Ca and the capacitor C2, whereby the capacitors Ca and C2 are charged up. The voltage C+ on the connection terminal AC+ of the capacitor Ca becomes VL1, and the voltage C− on the connection terminal AC− becomes Vss.

In the second step, the turning-on of the switch elements SW3A and SW3B applies the voltage VL1 of the capacitor Ca plus the input voltage VL1 to the capacitors C3 and C4, whereby the capacitors C3 and C4 are charged up. The voltage C+ of the capacitor Ca becomes VL1+VL1, and the voltage C− on the connection terminal AC− becomes VL1. The voltage VL3 on the connection terminal A3 of the capacitor C3 and the voltage VL4 on the connection terminal A4 of the capacitor C4 become VL1+VL1.

The operations of the first and second steps are repeated in succession for the first predetermined period, whereby the voltage VL3 of the connection terminal A3 and the voltage VL4 of the connection terminal A4 are maintained at a double boost voltage 2VL1. In FIG. 6, the first predetermined period corresponds to four cycles, with the period of the first step for double boosting and the second step for double boosting as a cycle. The first predetermined period is not limited thereto, however, and may be as long as one cycle.

Next, in the triple boosting operation mode, the operations of first to fourth steps (the first step for triple boosting to the fourth step for triple boosting) are repeated as shown in FIG. 6. The switch elements SW4A and SW4B are always off. The switch element SWC is always off as mentioned above. The switch element SWD is always on. In the first step, the switch elements SW1A and SW1B are turned on, and the switch elements SW2A, SW2B, SW3A and SW3B are turned off. In the next second step, the switch elements SW1A, SW1B, SW3A, and SW3B are turned off, and the switch elements SW2A and SW2B are turned on. In the third step, the switch elements SW1A and SW1B are turned on, and the switch elements SW2A, SW2B, SW3A and SW3B are turned off. In the fourth step, the switch elements SW1A, SW1B, SW2A, and SW2B are turned off, and the switch elements SW3A and SW3B are turned on.

In the first step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the second step, the turning-on of the switch elements SW2A and SW2B applies the input voltage VL1 plus the voltage VL1 of the capacitor Ca to the capacitor C2, whereby the capacitor C2 is charged up. That is, the voltage C+ of the capacitor Ca=VL1+VL1 is applied to the capacitor C2. The voltage C− on the connection terminal AC− becomes VL1. Immediately after entering the triple boosting operation mode, the capacitor C2 is charged in advance with the voltage VL1 on the connection terminal A2. The current that flows into the capacitor C2 when the voltage C+ of the capacitor Ca is applied to the capacitor C2 in the second step therefore has a suppressed peak as compared to the conventional circuit of FIG. 1.

In the third step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the fourth step, the turning-on of the switch elements SW3A and SW3B applies the voltage VL2 of the capacitor C2 plus the voltage VL1 of the capacitor Ca to the capacitors C3 and C4, whereby the capacitors C3 and C4 are charged up. The voltage C+ of the capacitor Ca becomes VL2+VL1, and the voltage C− on the connection terminal AC− becomes equal to VL2 of the capacitor C2. Immediately after entering the triple boosting operation mode, the capacitors C3 and C4 are charged in advance with the voltage 2VL1 on the connection terminals A3 and A4. Since the voltage C+ of the capacitor Ca is applied to the capacitors C3 and C4 in the fourth step, the voltage VL3 on the connection terminal A3 of the capacitor C3 and the voltage VL4 on the connection terminal A4 of the capacitor C4 rise to VL2+VL1, i.e., 3VL1.

Subsequently, the operations of the first to fourth steps in the triple boosting operation mode are repeated in succession for the second predetermined period, whereby the voltage VL3 of the connection terminal A3 and the voltage VL4 of the connection terminal A4 are maintained at the triple boost voltage 3VL1. The voltage VL2 of the connection terminal A2 becomes the double boost voltage 2VL1. In FIG. 6, the second predetermined period corresponds to two cycles, with the period of the first to fourth steps for triple boosting as a cycle. The second predetermined period is not limited thereto, however, and may be as long as one cycle.

Next, in the quadruple boosting operation mode, the operations of first to sixth steps (the first step for quadruple boosting to the sixth step for quadruple boosting) are repeated as shown in FIG. 6. The switch elements SWC and SWD are always off. In the first step, the switch elements SW1A and SW1B are turned on, and the switch elements SW2A, SW2B, SW3A, SW3B, SW4A, and SW4B are turned off. In the next second step, the switch elements SW1A, SW1B, SW3A, SW3B, SW4A, and SW4B are turned off, and the switch elements SW2A and SW2B are turned on. In the third step, the switch elements SW1A and SW1B are turned on, and the switch elements SW2A, SW2B, SW3A, SW3B, SW4A, and SW4B are turned off. In the fourth step, the switch elements SW1A, SW1B, SW2A, SW2B, SW4A, and SW4B are turned off, and the switch elements SW3A and SW3B are turned on. In the fifth step, the switch elements SW1A and SW1B are turned on, and the switch elements SW2A, SW2B, SW3A, SW3B, SW4A, and SW4B are turned off. In the sixth step, the switch elements SW1A, SW1B, SW2A, SW2B, SW3A, and SW3B are turned off, and the switch elements SW4A and SW4B are turned on.

In the first step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the second step, the turning-on of the switch elements SW2A and SW2B applies the input voltage VL1 plus the voltage VL1 of the capacitor Ca to the capacitor C2, whereby the capacitor C2 is charged up. That is, the voltage C+ of the capacitor Ca=VL1+VL1 is applied to the capacitor C2. The voltage C− on the connection terminal AC− becomes VL1.

In the third step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the fourth step, the turning-on of the switch elements SW3A and SW3B applies the voltage VL2 of the capacitor C2 plus the voltage VL1 of the capacitor Ca to the capacitor C3. The voltage C+ of the capacitor Ca becomes VL2+VL1, and the voltage C− on the connection terminal AC− becomes equal to VL2 of the capacitor C2. Immediately after entering the quadruple boosting operation mode, the capacitor C3 is charged in advance with the voltage 3VL1 on the connection terminal A3. Since the voltage C+ of the capacitor Ca is applied to the capacitor C3 in the fourth step, the voltage VL3 on the connection terminal A3 of the capacitor C3 is maintained at 3VL1.

In the fifth step, the turning-on of the switch elements SW1A and SW1B applies the input voltage VL1 to the capacitor Ca, whereby the capacitor Ca is charged up. The voltage C+ on the connection terminal AC+ of the capacitor Ca becomes VL1, and the voltage C− on the connection terminal AC− becomes Vss.

In the sixth step, the turning-on of the switch elements SW4A and SW4B applies the voltage VL3 of the capacitor C3 plus the voltage VL1 of the capacitor Ca to the capacitor C4, whereby the capacitor C4 is charged up. The voltage C+ of the capacitor Ca becomes VL3+VL1, and the voltage C− on the connection terminal AC− becomes equal to VL3 of the capacitor C3. Immediately after entering the quadruple boosting operation mode, the capacitor C4 is charged with the voltage 3VL1 on the connection terminal A4. Since the voltage C+ of the capacitor Ca is applied to the capacitor C4 in the sixth step, the voltage VL4 on the connection terminal A4 of the capacitor C4 rises to a quadruple boost voltage 4VL1.

Subsequently, the operations of the first to sixth steps in the quadruple boosting operation mode are repeated in succession, whereby the voltage VL4 of the connection terminal A4 is maintained to the quadruple boost voltage 4VL1. The voltage VL3 of the connection terminal A3 becomes the triple boost voltage 3VL1. The voltage VL2 of the connection terminal A2 becomes the double boost voltage 2VL1.

According to the quadruple boosting circuit in the another embodiment of the present invention, in the double boosting operation mode in the first predetermined period since the start of a boosting operation, the capacitor C2 is charged by the application of the input voltage VL1 so that the voltage across the capacitor C2 becomes equal to VL1. In the second step for triple boosting in the second predetermined period, the voltage applied to the capacitor C2 becomes twice the input voltage VL1, i.e., VL1+VL1. In the second step for double boosting in the first predetermined period, the application of the voltage VL1+VL1 to the capacitor C3 makes the voltage across the capacitor C3 equal to the twice the input voltage VL1, i.e., 2VL1. In the fourth step for triple boosting in the second predetermined period, the voltage applied to the capacitor C3 becomes equal to three times the input voltage, i.e., 3VL1. In the second step for double boosting in the first predetermined period, the application of the voltage VL1+VL1 to the capacitor C4 makes the voltage across the capacitor C4 equal to the twice the input voltage VL1, i.e., 2VL1. In the fourth step for triple boosting in the second predetermined period, the voltage applied to the capacitor C4 becomes equal to three times the input voltage, i.e., 3VL1. In the sixth step for quadruple boosting after the second predetermined period, the voltage applied to the capacitor C4 becomes equal to four times the input voltage, i.e., 4VL1. In order words, the voltages across the respective capacitors C2, C3, and C4 increase stepwise. The peak currents to flow into the respective capacitors C2, C3, and C4 at the start of the boosting operation can thus be suppressed as compared to the conventional boosting circuit. This makes it possible to boost the input voltage four times without causing a drop in the level of the input voltage.

The foregoing embodiments have dealt with the triple boosting circuit and the quadruple boosting circuit to which the present invention is applied. The present invention is not limited thereto, and may be applied to a boosting circuit that boosts an input voltage to a voltage three or higher integer times. For example, a quintuple boosting circuit may be configured to implement stepwise boosting in order of a double boosting operation mode, a triple boosting operation mode, a quadruple boosting operation mode, and a quintuple boosting circuit in the same way as described above.

In the foregoing embodiments, the capacitor C1 is connected between the connection terminals A1 and AG to which the input voltage is supplied. The capacitor C1, however, is not an indispensable component of the present invention. The output of a not-shown power supply (including batteries) for supplying the power supply voltage VL1 may be simply connected to the connection terminals A1 and AG.

What is claimed is:

1. A semiconductor device for boosting a voltage, comprising:
   a semiconductor chip which is supplied with an input voltage;
   a first capacitor which is connected to the semiconductor chip and is supplied with a potential difference corresponding to the input voltage;
   a second capacitor which is connected to the semiconductor chip, is supplied with a first voltage corresponding to the potential difference in a double boosting operation, and is supplied with a second voltage corresponding to twice the potential difference in a triple boosting operation; and
   an output capacitor which is connected to the semiconductor chip, is supplied with the second voltage from the first capacitor and the second capacitor in the double boosting operation, and is supplied with a third voltage corresponding to three times the potential difference from the first capacitor and the second capacitor in the triple boosting operation;

wherein the output capacitor is configured to be supplied with the first voltage and the second voltage in advance of being supplied with the second voltage and the third voltage, in the double boosting operation and the triple boosting operation, respectively.

\* \* \* \* \*